United States Patent
Goh et al.

(10) Patent No.: US 12,255,929 B1
(45) Date of Patent: Mar. 18, 2025

(54) WEIGHTED TIMES SERIES FREQUENCY—INVERSE DOCUMENT FREQUENCY SCORING FOR CYBERSECURITY ALERTS

(71) Applicant: Morgan Stanley Services Group Inc., New York, NY (US)

(72) Inventors: Shouhao Goh, Jersey City, NJ (US); Imran Khaliq, Glasgow (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/820,411

(22) Filed: Aug. 30, 2024

(51) Int. Cl.
*H04L 9/40* (2022.01)

(52) U.S. Cl.
CPC ........ H04L 63/205 (2013.01); H04L 63/1425 (2013.01)

(58) Field of Classification Search
CPC . H04L 63/205; H04L 63/1425; G06F 21/316; G06F 11/3409; G06F 11/3452
See application file for complete search history.

(56) References Cited

U.S. PATENT DOCUMENTS

| | | | |
|---|---|---|---|
| 11,509,674 B1 | 11/2022 | Beauchesne et al. | |
| 11,610,441 B1* | 3/2023 | Bernico | G06Q 40/08 |
| 11,818,156 B1 | 11/2023 | Parikh et al. | |
| 11,853,853 B1 | 12/2023 | Beauchesne et al. | |
| 2018/0332017 A1* | 11/2018 | Childress | H04L 63/08 |
| 2020/0092306 A1 | 3/2020 | Jusko et al. | |
| 2021/0306358 A1* | 9/2021 | Luo | H04L 63/1416 |
| 2021/0319179 A1 | 10/2021 | Muffat | |
| 2022/0237383 A1* | 7/2022 | Park | G06N 20/00 |
| 2022/0269989 A1* | 8/2022 | Lu | G06F 11/3447 |
| 2022/0398182 A1* | 12/2022 | Liu | G06F 11/3419 |
| 2023/0098812 A1 | 3/2023 | Rivlin | |
| 2023/0267368 A1* | 8/2023 | Paulitsch | G05B 23/0254 706/12 |
| 2023/0275917 A1 | 8/2023 | Karmali et al. | |
| 2023/0283620 A1 | 9/2023 | Shapira | |
| 2023/0325292 A1* | 10/2023 | Ardel | G05B 23/0254 702/183 |
| 2024/0098108 A1* | 3/2024 | Limb | H04L 63/1425 |
| 2024/0113933 A1* | 4/2024 | Sridhar | H04L 41/5067 |

OTHER PUBLICATIONS

Bi et al., "Assessment of Algorithms for Estimating Chlorophyll-a Concentration in Inland Waters: A Round-Robin Scoring Method Based on the Optically Fuzzy Clustering," IEEE Transactions on Geoscience and Remote Sensing Year: 2022 | vol. 60 | Journal Article | Publisher: IEEE.*
Komadina et al., "Comparing Threshold Selection Methods for Network Anomaly Detection," IEEE Access Year: 2024 | vol. 12 | Journal Article | Publisher: IEEE.*

* cited by examiner

*Primary Examiner* — Roderick Tolentino
(74) *Attorney, Agent, or Firm* — Hunton Andrews Kurth LLP

(57) ABSTRACT

Systems and methods for intelligently clustering alerts and applying a multi-stage scoring approach to prioritize and effectively address cybersecurity alerts are disclosed. The multi-stage scoring approach may involve applying Time Series Frequency-Inverse Document Frequency (TSF-IDF) Scores that represent a novelty of a cluster and Confidence Scores that represent a measure of accuracy based on prior performance including true positives and other indicia of accuracy.

18 Claims, 7 Drawing Sheets

TRIAGE Short Term Windows Host Cluster 410

412

| Case created | | Status |
|---|---|---|
| August 6, 2024 @ 7:00:55 | | Open |
| Open duration | 414 | Sync alerts |
| X hours | In progress duration | |
| | Duration from creation to close | |

Activity 416 ---

Description 418

TRIAGE Short Term Windows Host Cluster 420

Cluster Key: alert.hostname = myhost.mynetwork.com ✎ 422

Cluster Key Field Alerts Pivot ⧉ 424

| Severity | 426 |
|---|---|
| ○ High | ∨ |

| Reporter | 428 |
|---|---|
| ⓘ internal_api | ✉ |

| Participants | 430 |
|---|---|
| ⓘ internal_api | ✉ |

| Tags | 432 |
|---|---|
| No tags are added | |

| Cluster Field 440 | Cluster Value 442 |
|---|---|
| Cluster UID | 111xx0xx-x11x-1111-xx1x-1xxx0x0x000x |
| Total alert count | 2 |
| Unique analytic count | 2 |
| Score | 6.4062 |
| Analyzed Period | 8h |
| Referenced Period | 24h |

| Category | 434 |
|---|---|
| No category is added | |

| analytic_name 444 | updated-at 446 | Description 448 |
|---|---|---|
| Analytic 1 | Date/Time 1 | Description 1 |
| Analytic 2 | Date/Time 2 | Description 2 |

WEIGHTED TIMES SERIES FREQUENCY—INVERSE DOCUMENT FREQUENCY SCORING FOR CYBERSECURITY ALERTS

FIELD OF THE INVENTION

The present invention relates generally to intelligently clustering alerts and applying novelty and accuracy scores to prioritize and effectively address cybersecurity alerts.

BACKGROUND

Most organizations utilize some type of cybersecurity alert system to identify and respond to security threats before they cause damage to systems, data and other valuable resources. Threat detection systems use security tools to monitor endpoints, identities, networks, applications and other activity to uncover and detect potentially suspicious activity. When activity is detected, an alert is triggered and notification of the alert is communicated.

As cybersecurity threats continue to grow and become more difficult to catch, organizations are expanding their efforts. This may involve casting a wider net by monitoring more types of activity. These increased efforts lead to a higher volume of triggered alerts that need to be analyzed and addressed.

Once a threat has been identified, an appropriate response needs to be developed and then employed. But limited resources significantly hinder the ability to properly analyze alerts. As a result, some threats go undetected and are allowed to continue and grow more invasive. In most organizations, threat detection will result in tens of thousands of alerts that need to be addressed, all seemingly equally urgent. Without the needed resources, proper responses will not be implemented thereby resulting in system and data vulnerabilities.

Accordingly, there is a need for an improved system and method for identifying threats within a large pool of alerts in an accurate and resource-efficient manner.

SUMMARY

Systems and methods for implementing an alert clustering scoring algorithm using weighted time series frequency-inverse document frequency scoring based on a Bayesian estimation for cybersecurity alerts are disclosed.

According to an embodiment, a computer-implemented system comprises: a computer server comprising one or more processors; a memory component storing alert data; and non-transitory memory comprising instructions that, when executed by the one or more processors, cause the one or more processors to: receive a plurality of alerts from a threat detection system; group the plurality of alerts into clusters based on a clustering key and a selection time window; calculate a times series frequency-inverse document frequency (TSF-IDF) score for each cluster; calculate an analytic confidence score for each cluster based on a true positive rate, a prior distribution and a posterior distribution; combine the TSF-IDF score and the analytic confidence score for each cluster to generate an aggregate of alert scores wherein each individual alert score comprises an alert frequency, an inverse cluster frequency and the analytic confidence score; select a subset of the clusters based on a case selection configuration; transmit the subset of the clusters to an output interface to generate a triage output; and apply a feedback based at least in part on the triage output to the analytic confidence score.

According to another embodiment, a computer-implemented method comprises the steps of: receiving, via a communication network, a plurality of alerts from a threat detection system; grouping, via one or more computer processors, the plurality of alerts into clusters based on a clustering key and a selection time window; calculating, via the one or more computer processors, a times series frequency-inverse document frequency (TSF-IDF) score for each cluster; calculating, via the one or more computer processors, an analytic confidence score for each cluster based on a true positive rate, a prior distribution and a posterior distribution; combining, via the one or more computer processors, the TSF-IDF score and the analytic confidence score for each cluster to generate an aggregate of alert scores wherein each individual alert score comprises an alert frequency, an inverse cluster frequency and the analytic confidence score; selecting, via the one or more computer processors, a subset of the clusters based on a case selection configuration; transmitting, via a user interface, the subset of the clusters to an output interface to generate a triage output; and applying, via the one or more computer processors, a feedback based at least in part on the triage output to the analytic confidence score.

According to another embodiment, a computer-implemented system comprises: a computer server comprising one or more processors; a memory component storing alert data; and non-transitory memory comprising instructions that, when executed by the one or more processors, cause the one or more processors to: receive a plurality of alerts from a threat detection system; group the plurality of alerts into clusters based on a clustering key and a selection time window; determine a pattern match between each cluster and a pattern specification based on one or more of: attack simulation data and threat intelligence data, wherein the pattern specification is defined by a set of fields comprising at least: a pattern type, a pattern of analytics and a threshold; generate a score based on the pattern match; select a subset of the clusters based on a case selection configuration; and transmit the subset of the clusters to an output interface to generate a triage output.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

FIG. 4 is an exemplary user interface, according to an embodiment of the present invention.

DETAILED DESCRIPTION

Figure 1:
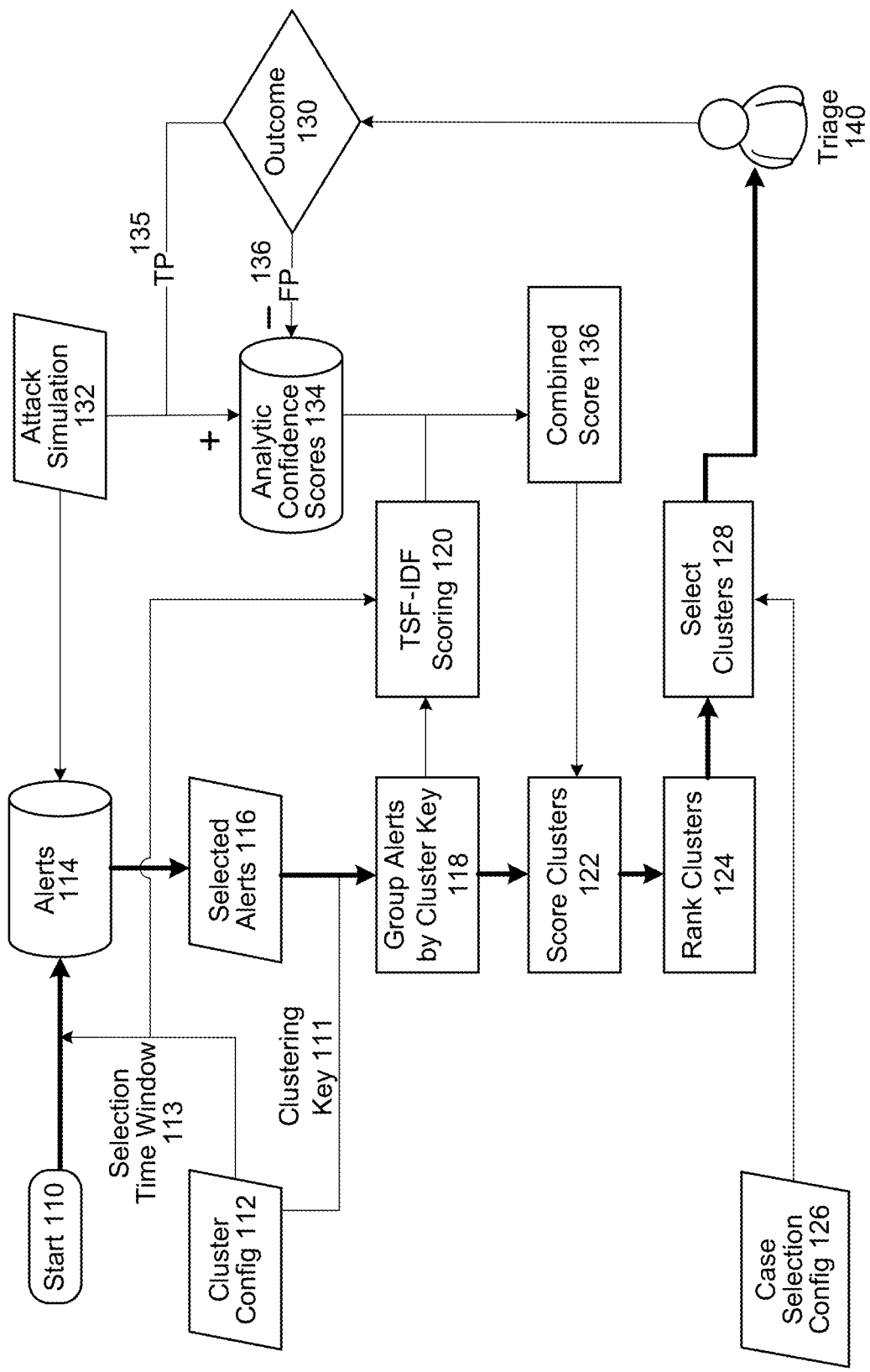
FIG. 1 is an exemplary overview diagram, according to an embodiment of the present invention.

Exemplary embodiments of the invention will be described in order to illustrate various features of the invention. The embodiments described herein are not intended to be limiting as to the scope of the invention, but rather are intended to provide examples of the components, use, and operation of the invention.

Organizations currently use some form of cybersecurity detection that generates a huge volume of alerts. It is common to have many alerts on any given day. Even with a team of global analysts, it is nearly impossible to analyze this volume of alerts. An embodiment of the present invention is directed to clustering alerts into groups and then intelligently and accurately prioritize the groups of alerts as being the most interesting or worth examining. Because current threat detection systems generate far more alerts than can be assessed by security analysts, it is necessary to group and prioritize the more salient alerts.

An embodiment of the present invention is directed to prioritizing alerts through a weighted Time Series Frequency-Inverse Document Frequency (TSF-IDF) algorithm for scoring clusters of alerts identified by threat hunt analytics or other tool that searches for potential threats within a system, network, organization, enterprise, etc. The Weighted Time Series Frequency-Inverse Document Frequency is an adaptation of a TF-IDF (Term Frequency-Inverse Document Frequency) algorithm. TF-IDF generally represents a measure of importance of a word to a document in a corpus adjusted for some words appearing more frequently.

An embodiment of the present invention is directed to scoring clusters based on their frequency of occurrence within a configured time window and grouping. The TSF-IDF scoring represents a novelty or the uniqueness of a cluster. This scoring may then be augmented by confidence scores that represent an accuracy based on historical data. The confidence scores may be determined using an estimation, such as a Bayesian estimation, that combines initially assigned alert confidence ratings with subsequently observed True Positive rates and other indicia of accuracy and performance.

An embodiment of the present invention is directed to an implementation of a TF-IDF algorithm that combines with a continuous feedback loop based on an estimation, such as a Bayesian estimation. This distinguishes it from other approaches which use one-off or ad-hoc model training. In addition, an embodiment of the present invention provides users with configurable sets of alert data with variable time windows and clustering keys.

An embodiment of the present invention provides significant technological benefits over current systems. For example, the system is adaptive by applying a continuous feedback that improves its fidelity over time. In addition, the groupings and weightings are configurable, which coupled with the transparency of the TF-IDF model, provides the ability to make informed tuning decisions. The system provides flexibility by handling a wide range of different alert schemas, such as host-based alerts, network activity, cloud-based alerts, etc.

FIG. 1 is an exemplary overview diagram, according to an embodiment of the present invention. At 110, a process may be initiated. Alerts may be received at 114. Alerts 114 may be generated by analyzing and matching various types of data from a wide range of sources. For example, sources may include threat analytics systems that receive data from various sources and then determine whether the data is indicative of a potential threat through a set of matching rules or other determination process. If so, an alert may be generated and communicated. The data may include various types of information including audit logs, endpoint logs, proxy logs, network logs, ingress traffic data, outbound traffic data, etc. For example, the data may represent day-to-day activity relating to billions of individual events. The alerts themselves may represent a variety of alerts that match certain rules and/or threat signatures. For example, alerts may include the type of detection, context, log sources, metadata, etc.

Cluster Config 112 represents cluster configuration data. In this example, Selection Time Window 113 and Clustering Key 111 may be identified and applied. Clustering Key 111 may represent a key feature that is used to cluster the alerts. Clustering Key 111 may include IP address, host computer, location, username, etc. Other types of cluster configuration data may be applied.

The Selection Time Window 113 may be applied to Alerts 114 to identify Selected Alerts 116. Clustering Key 111 may be applied to the Selected Alert 116 to generate Group Alerts by Cluster Key 118. The Selection Time Window 113 may represent any defined time period and may be configurable by a user, a system and/or automatically generated.

Selection Time Window 113 may be applied to TSF-IDF Scoring 120. TSF-IDF Scoring 120 may be applied to Cluster Groups identified by 118.

Analytics Confidence Scores 134 may receive inputs from an Attack Simulation 132 and prior outcomes 130, as shown by True Positive 135 and False Positive 136. Analytics Confidence Scores 134 may be generated by a Bayesian estimation that is based on initially assigned alert confidence and subsequently observed true positives.

The TSF-IDF Scoring 120 may be combined with Analytics Confidence Scores 134 to generate a combined Confidence Score 136. Confidence Score 136 may then be applied to Score Clusters 122.

The Clusters may be ranked at 124. Ranking may be applied in various ways. For example, multiple levels of ranking may be applied including ranking by score, the number of unique alerts, and overall number of alerts. In an example where there are two clusters having the same score, an embodiment of the present invention may rank by the cluster with the more unique alerts. If the unique alerts also match, the cluster having a higher total number of alerts may be ranked higher. Other ranking conditions may be implemented.

Case Selection Config 126 may be applied to Selected Clusters 128. Case Selection Config 126 provides an ability to configure the selection metrics. The selection may be configurable based on various factors, including available resources, types of cases, urgency factors, limits, etc. For example, Case Selection Config 126 may account for a number of analysts being unavailable due to holiday or other reason. Due to the limited resources, Case Selection Config 126 may make selections that limit the number of clusters. In another example, Case Selection Config 126 may prioritize certain types of cases, e.g., IP-based clusters, Windows clusters, Linux clusters, location-based, application-based, etc. In addition, Case Selection Config 126 may adjust configuration selection parameters based on various factors and considerations. In certain situations, the adjustment may be automatic, based on feedback, AI/ML generated, etc.

An embodiment of the present invention is able to intelligently cluster alerts and further prioritize based on a combination of scores that capture uniqueness and accuracy of a huge volume of alerts, e.g., hundreds, thousands, tens of thousands, etc. The innovative combination of scores may be applied to various clusters in a manner that identifies top ranked clusters for analyst review and attention. Rather than analyzing an overwhelming number of alerts, an embodiment of the present invention is able to cluster, score and rank alerts to a reasonable number on a continuous basis.

The resulting clusters may be available for analyst triage at 140. Outcomes 130 may be applied to further refine and generate Analytic confidence scores.

An embodiment of the present invention is directed to generating Confidence Scores. For example, Analytic Confidence Score 134 may be based on a True Positive Rate, a Prior Distribution and a Posterior Distribution.

Regarding a True Positive Rate, for any individual alert, the outcome (e.g., true or false positive) may be modeled as a Bernoulli random variable:

Outcome~Bernoulli($\theta$)

So that:

$P$(Outcome=True Pos.)=$\theta$

For a collection of n alerts of a given type, the number of true positives, K, is then:

$K$~Binomial($n,\theta$)

which is calculated as:

$$P(K = k \mid \theta) = \binom{n}{k}\theta^k(1-\theta)^{n-k}$$

Regarding Prior Distribution, because a Bayesian estimation is used to calculate the true positive rate, the parameter $\theta$ may also be treated as a random variable from a Beta-distribution:

$\theta$~Beta($\alpha,\beta$)

The parameters $\alpha$ and $\beta$ may be set with respect to the prior estimate for the true positive rate, which may be based on the "confidence" label that is part of the alert metadata. For example, this may take one of three values: Low, Medium or High. These may be mapped onto the values 0.1, 0.5 and 0.9, respectively. Other values may be applied. This number may be considered the mode of the prior. To map these onto $\alpha$ and $\beta$, the formula may be represented as:

$\alpha=m\times k+1$ $\beta=(1-m)\times k+1$ where m is the prior mode, and k is an arbitrary parameter for adjusting the spread of the distribution, with a higher k giving a tighter spread and therefore a "stronger" prior distribution.

Regarding Posterior Distribution, the combination of a binomial random variable with beta prior distribution results in a Beta-binomial conjugate distribution, with parameters:

$K$~Beta($\alpha+n,\beta+n-p$)=Beta($\alpha',\beta'$)

where p is the number of true positives out of the n total alerts. Accordingly, the final confidence score estimate may be calculated as the mode of this distribution, which, for $\alpha'>1, \beta'>1$, is:

$$\hat{\theta} = \frac{\alpha' - 1}{\alpha' + \beta' - 2}$$

An embodiment of the present invention is directed to generating Cluster Scores using TSF-IDF, as shown by 120. For example, Cluster Scores may use an adaptation of the TF-IDF (Term Frequency-Inverse Document Frequency) algorithm which originates from natural language processing. In this implementation, "Term frequency" may be replaced with (temporal) alert frequency and "Inverse Document Frequency" may be replaced with Inverse Cluster Frequency. Accordingly, the algorithm has been adapted to work with univariate time series data. This may be referred to as TSF-IDF (Time Series Frequency-Inverse Document Frequency). Here, terms may be weighted according to their confidence scores.

For a given time window, the score for each alert in a cluster may be calculated as:

Alert Score=alert frequency×inverse cluster frequency×confidence score where:

$$\text{alert frequency} = \frac{\text{count of alert}}{\text{time window duration}}$$

$$\text{inverse cluster frequency} = \log\left(\frac{\text{number of clusters}}{\text{number of clusters containing the alert}}\right)$$

and confidence score may be as described above.

The overall cluster score may then be represented as:

max (Alert Scores)

An embodiment of the present invention recognizes that the clustering may tend to be dominated by a small number of very "noisy" hosts, that is, hosts which repeatedly trigger alerts but which are benign in nature. In the long term, this is an alert tuning issue. To address this, in this specific implementation, the alert frequency may be capped so that the frequency component does not excessively dominate the score.

Figure 2:
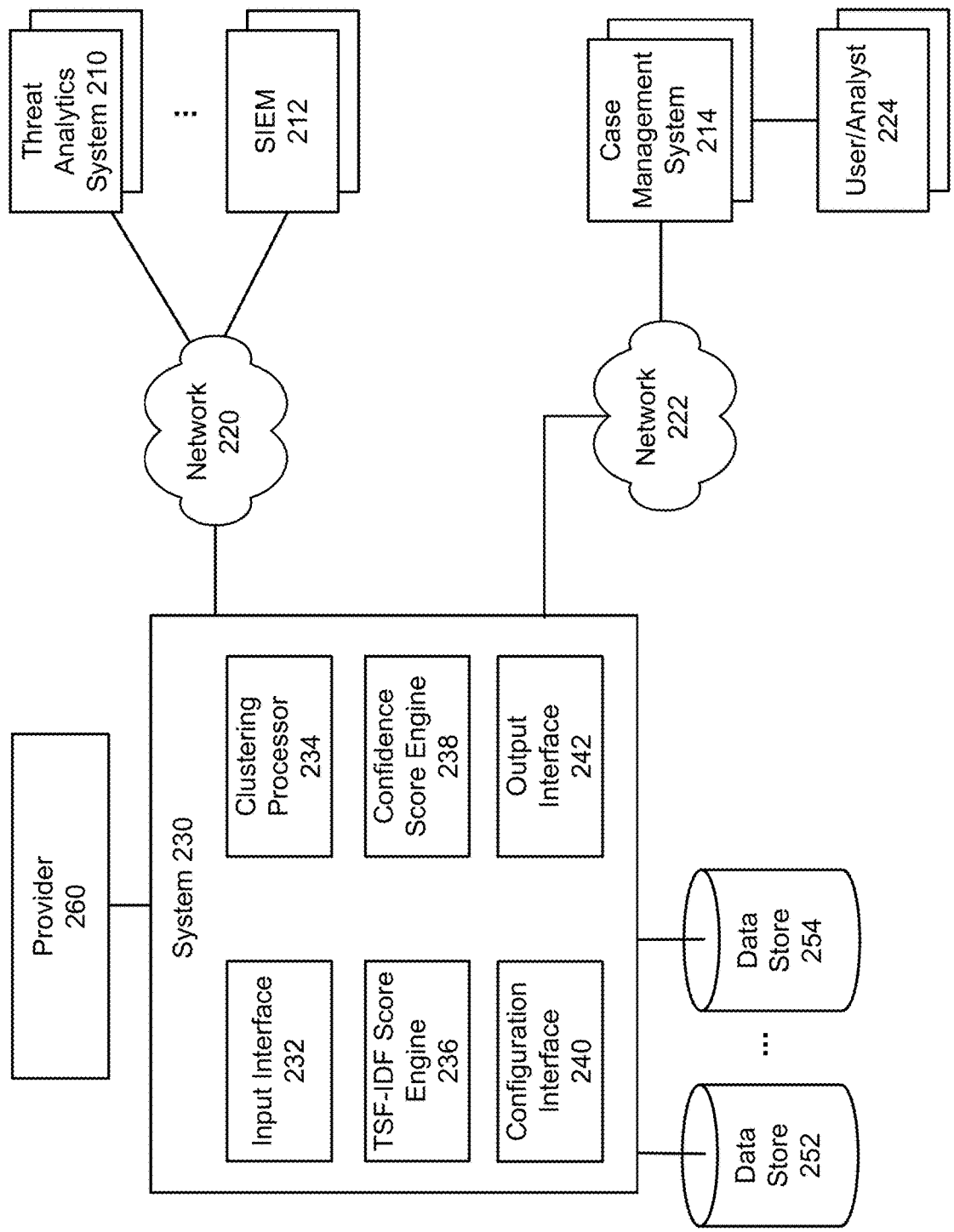
FIG. 2 is an exemplary system diagram, according to an embodiment of the present invention.

FIG. 2 is an exemplary system diagram, according to an embodiment of the present invention. FIG. 2 illustrates a schematic diagram of a system that implements Weighted Times Series Frequency-Inverse Document Frequency Scoring for Cybersecurity Alerts, according to an exemplary embodiment. As illustrated in FIG. 2, Network 220 may be communicatively coupled to Threat Analytics Systems, represented by 210. Other systems may be supported including SIEM 212, Case Management System 214 via various computing devices. Computing devices may include computers, laptops, workstations, kiosks, terminals, tablets, mobile devices, mobile phones, smart devices, etc.

Network 220 communicates with System 230 that provides clustering and scoring analysis. System 230 may include Input Interface 232, Clustering Processor 234, TSF-IDF Score Engine 236, Confidence Score Engine 238, Configuration Interface 240 and Output Interface 240.

Input Interface 232 may interface with various systems to receive alerts and related data.

Clustering Processor 234 may cluster alerts based on cluster keys and a time window. Other factors may be considered.

TSF-IDF Score Engine 236 may calculate a TSF-IDF score that represents how novel an alert cluster is.

Confidence Score Engine 238 may calculate a confidence score that represents an accuracy component that is used to augment the TSF-IDF score.

Configuration Interface 240 may be provided to enable customization and fine-tuning features. For example, a user may adjust parameters through Cluster Configuration and Case Selection Configuration.

Output Interface 242 may interface with a triage system or other interface, as shown by Case Management System 214, that communicates with an analyst or other user 224 via Network 222. Others users and integrations may be supported.

The system components are exemplary and illustrative. System 230 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System 230 may be communicatively coupled to data storage devices represented by Data stores 252, 254. Data stores 252, 254 may also store and maintain source code, reports, performance data, historical data, etc. The clustering and scoring features described herein may be provided by System 230 and/or a third party provider, represented by 260, where Provider 260 may operate with System 230.

The system 200 of FIG. 2 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 is depicted, it should be appreciated that other connections and relationships are possible. The system 200 described below may be used to implement the various methods herein, by way of example. Various elements of the system 200 may be referenced in explaining the exemplary methods described herein.

Networks 220, 222 may be a wireless network, a wired network or any combination of wireless network and wired network. Networks 220, 222 may further include one, or any number of the exemplary types of networks operating as a stand-alone network or in cooperation with each other. Networks 220, 222 may utilize one or more protocols of one or more network elements to which it is communicatively coupled. Networks 220, 222 may translate to or from other protocols to one or more protocols of network devices. Although Networks 220, 222 may be depicted as one network for simplicity, it should be appreciated that according to one or more embodiments, Networks 220, 222 may comprise a plurality of interconnected networks, such as, for example, a service provider network, the Internet, a cellular network, corporate networks, or even home networks, or any of the types of networks mentioned above.

Data may be transmitted and received via Networks 220, 222 utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While FIG. 2 illustrates individual devices or components, it should be appreciated that there may be several of such devices to carry out the various exemplary embodiments. System 230 may communicate using any mobile or computing device, such as a laptop computer, a personal digital assistant, a smartphone, a smartwatch, smart glasses, other wearables or other computing devices capable of sending or receiving network signals. Computing devices may have an application installed that is associated with Entity 230.

System 230 may be communicatively coupled to Data Stores 252, 254 as well as remote storages. These storage components may include any suitable data structure to maintain the information and allow access and retrieval of the information. The storage may be local, remote, or a combination. The storage components may have back-up capability built-in. Communications with the storage components may be over a network, such as Networks 220, 222, or communications may involve a direct connection between the various storage components and Provider 260, as depicted in FIG. 2. The storage components may also represent cloud or other network based storage.

Figure 3:
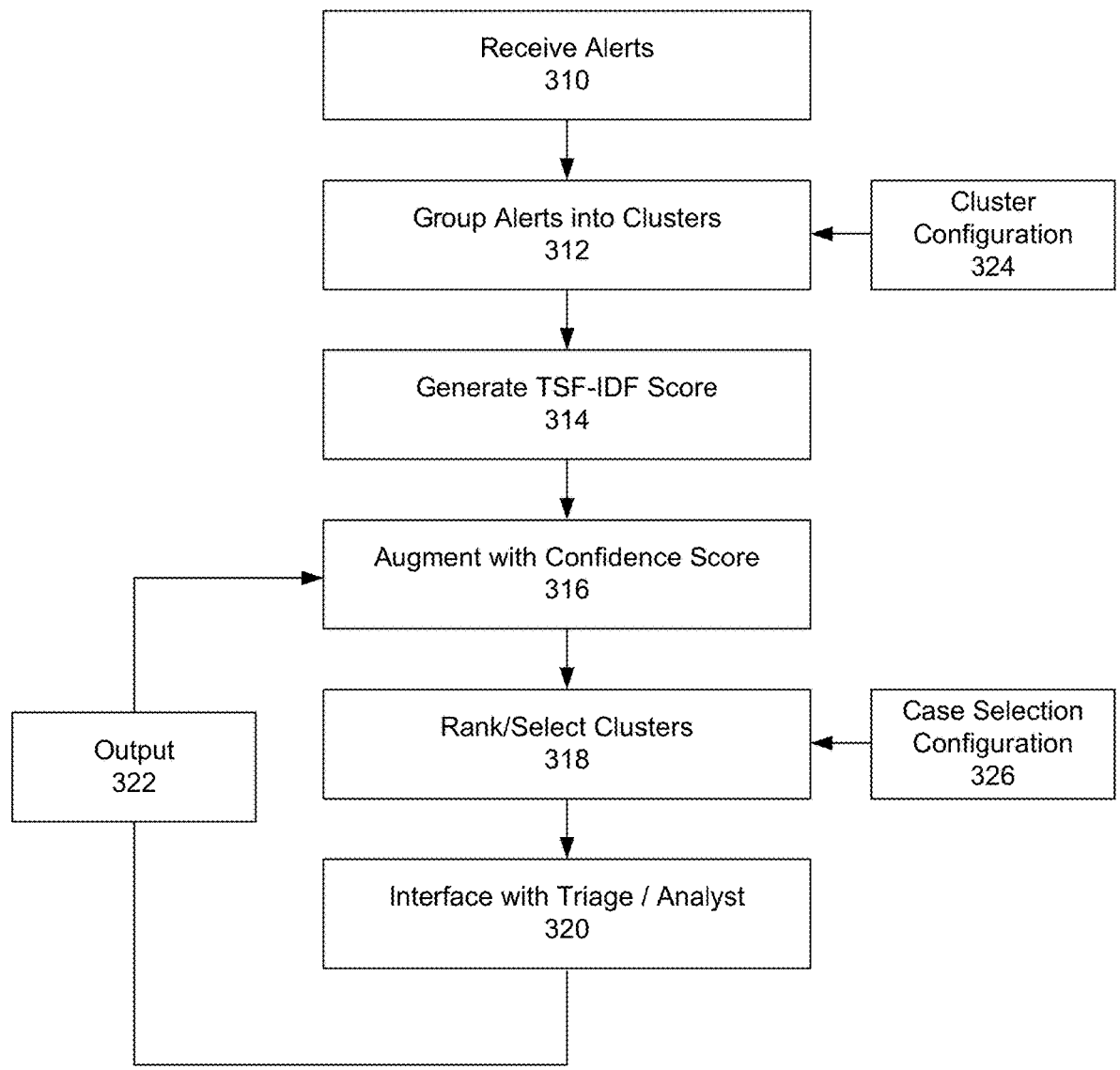
FIG. 3 is an exemplary flowchart, according to an embodiment of the present invention.

FIG. 3 is an exemplary flowchart, according to an embodiment of the present invention. At step 310, alerts may be received from various systems. At step 312, the alerts may be grouped into clusters based on a cluster key. At step 314, a TSF-IDF score may be generated. At step 316, the TSF-IDF score may be augmented by a confidence score. At step 318, the combined score may be ranked and then selected. At step 320, the corresponding cluster may be communicated to an analyst through a triage interface. At step 322, the output of the triage interface may be used to improve upon the confidence score. Configuration data may be used to adjust the grouping of alerts at step 324. Configuration data may also be used to adjust selection and ranking of cluster at step 326. While the process of FIG. 3 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 310, alerts may be received from various systems across an enterprise or platform.

At step 312, the alerts may be grouped into clusters based on a cluster key and time window through configuration data as shown by Cluster Configuration 324. An embodiment of the present invention recognizes that for a large number of alerts, there are many that stem from a single event or are related in some manner. For example, a single computer may be the source of a number of related alerts. Other commonalities may include the same user, same location, a certain network path, etc. According to another example, the same alert may be generated many times over. In yet another example, alerts may occur in a sequence or progression. These commonalities may be used to group alerts by a cluster key.

The clustered alerts may then be prioritized through a multi-stage scoring approach. The scoring may be used to rank the clustered alerts based on how anomalous the clusters are.

At step 314, a TSF-IDF score may be generated. The multi-stage scoring approach may involve applying TSF-IDF Scores that represent novelty (e.g., how anomalous or unique are the alert clusters).

At step 316, the TSF-IDF score may be augmented by a confidence score. For example, the TSF-IDF score and the confidence score for each cluster may be combined to generate an aggregate of alert scores wherein each individual alert score comprises an alert frequency, an inverse cluster frequency and a confidence score.

Confidence Scores may represent a measure of accuracy taking into account historical and feedback data from prior outcomes such as true positives and false positives and/or other indicia of accuracy. For example, a cluster may be scored and ranked high, resulting in an analyst review that generates an escalation, subsequent investigation and response. The cluster may be deemed a true positive and further used to boost the confidence score. Similarly, a false positive may be used to downgrade the confidence score. In addition, more granular data may be used to increased or decrease incrementally.

Confidence Scores may also use data from simulations for improved accuracy and competency. For example, an attack simulation or penetration test may deploy a simulated cyber attack against a computer system to check for vulnerabilities. The results may be used to increase/decrease the competency of those alerts. For example, a simulated attack may result in an accurate detection. This result may be applied as feedback to the confidence score.

At step 318, the combined score may be ranked and then selected which may be based on configuration data shown at Case Selection Configuration 326. This configuration data may prioritize/deprioritize as well as limit the number of cases generated. The TSF-IDF score and confidence score may be combined for each cluster of alerts. This may be realized through multiplication of the two scores or other operation. The combined scores may be ranked for priority.

At step 320, the corresponding cluster may be communicated to an analyst through a triage interface. Cluster details may be available through a user interface or other system.

At step 322, the output of the triage interface may be used to improve upon the confidence score. An embodiment of the present invention may be directed to increasing the estimated/perceived fidelity or accuracy of an input. For example, when an alert cluster is deemed credible and a true positive has been noted, feedback from the outcome further down the process (after the alert cluster has been escalated) may be considered. In certain circumstances, a remediation action may be needed to address damage (e.g., outage, compromised data, etc.). In another instance, an attack may be denied or otherwise prevented resulting in a non-issue. A range of outcomes may be considered as feedback to increase the accuracy and overall fidelity of the process and system. The level of feedback detail may also vary from high level to granular detailed feedback information. An embodiment of the present invention may apply artificial intelligence (AI)/machine learning (ML) to further improve the accuracy.

FIG. 4 is an exemplary user interface, according to an embodiment of the present invention. An analyst or other user may interact with an embodiment of the present invention through user interface 400. FIG. 4 provides details relating to a specific cluster, Triage Short Term Windows Host Cluster 410. As shown in FIG. 4, cluster details 412 may include case created and open duration. Progress data may be shown at 414. Activity details may be provided at 416 and include a cluster description at 418, a name or identifier at 420, one or more cluster keys at 422 and cluster key field alerts pivot at 424. In this example, the cluster key of hostname was applied, as shown by 422. Additional details may be provided at Severity 426, Reporter 428, Participants 430, Tags 432 and Category 434. Other interfaces, filters and interactive components may be provided.

Cluster Fields and corresponding Cluster Values may be shown at 440, 442, respectively. In this example, Cluster Field 440 may include Cluster Identifier, Total Alert Count, Unique Analytic Count, Score, Analyzed Period and Referenced Period.

As shown in FIG. 4, the analyzed time period is 8 hours of activity and the referenced period is a span of 24 hours. Here, the 8 hours of activity is compared to activity in an entire network for the past 24 hours. For long term clusters, the referenced period may be in the order of days, weeks, etc. For example, the referenced period may determine the inverse document frequency portion of the IDF score. The analyzed period may determine the time period that alerts in the analyzed cluster happened. The referenced period may be used to directly determine the term frequency, and indirectly, the inverse document frequency of the alert, e.g., how many clusters in the referenced period contain the given alert, and conversely how many other clusters in the referenced period do not.

FIG. 4 may also provide analytic details including Analytic Name 444, Updated At 446 and Description 448. As shown in Cluster Field 440 and Cluster Value 442, a total alert count is 2 with unique analytics also at 2. The unique analytics are shown as Analytic 1, Analytic 2. Analytic details provide context relating to the specific analytic score. For example, an additional interface may provide details concerning a specific Analytic, identified at 444.

As shown at 444 and 448, Analytic 1 may include a descriptive string such as "proc_creation_win_net_use_mount_internet_share" with a corresponding description of "detects when an internet hosted webdav share is mounted." Analytic 2 may include a descriptive string such as "proc_creation_win_net_use_mount_share" with a corresponding description of "detects when a share is mounted using the 'net.exe' utility." The Updated-At field 446 provides an indication of how recent or new the analytic is. An "analytic" may represent a specific detection rule, e.g., detecting when a certain malicious executable is run. An "alert" may represent when that rule executes, e.g. when that activity is actually detected on a certain computer. In this context, 446 identifies when changes have been made to the detection logic.

In other examples, there may be more total alerts than unique analytics. For example, for another cluster, a total alert count may be 15 alerts with 1 unique analytic. In this example, the 15 alerts are all related to the same activity within a narrow timeframe and from the same person.

Another cluster may be specific to a cyber security framework that describes phases of a cyber security incident (e.g., from initial access, lateral movement, etc.). In this example, analytics that cross phases thereby indicating incident progression may be accurately and quickly identified.

In addition, an embodiment of the present invention may generate scores based on particular analytic as well as a combination of multiple analytics to ascertain uniqueness. For example, a combination of three analytics provides additional insights in identifying unusual behavior than when an individual alert is analyzed in isolation. In this example, an alert in isolation may not indicate unusual behavior but when the alert is combined with two or more other alerts, activity on a single host at the same time may be considered unusual. Additional patterns of uniqueness may be discovered when considering a combination of alerts. The number of unique analytics in a combination may be configurable and may be as expansive as desired.

A benefit of clustering the alerts together is that analysts do not need to review and analyze each alert on an individual basis. By analyzing clusters (instead of examining individual alerts), an embodiment of the present invention enables analysts to determine a more holistic, comprehensive and accurate view of alert activity across a system, platform, etc.

Additional user interfaces may be supported where case alert details may be simultaneously displayed in a side-by-side manner. Case alert details may include: Analytic Name, Analytic Type, Life Cycle, Severity, Confidence, Date/Time and Alert Identifier.

Other interfaces may provide a summary of alert clusters across an activity chart and corresponding Field Statistics. For example, Field Statistics may include: Timestamp; Analytic Name; Alert Date Time String; Alert Hostname; Alert Windows User; Alert Windows Event Identifier; Alert Windows Parent Image; Alert Windows Parent Command; Alert Windows Image Name; and Alert Windows Command Line.

An embodiment of the present invention is directed to Configuration Interface 240 may be provided to enable customization and fine-tuning features. For example, a user may adjust parameters through Cluster Configuration and Case Selection Configuration.

Figure 5:
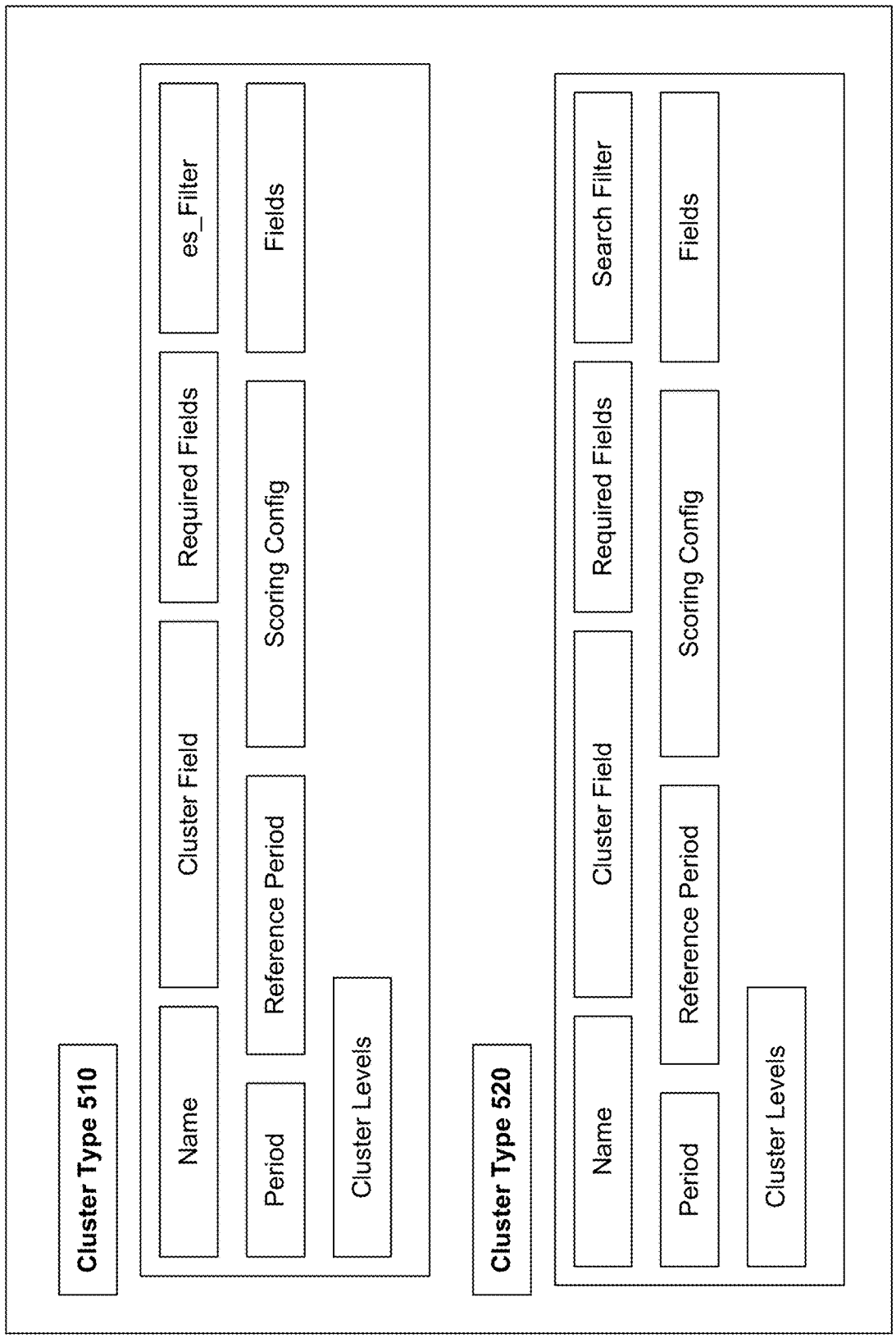
FIG. 5 is an exemplary user interface, according to an embodiment of the present invention.

FIG. 5 is an exemplary user interface, according to an embodiment of the present invention. FIG. 5 is an exemplary cluster configuration interface that shows how different cluster types are configured. Cluster types, represented by Cluster Type 510 and 520, may include Host, Cloud, Network, email, etc. Each Cluster Type may include configurable data including Name, Cluster Field, Required Fields, Search Filter; Period, Reference Period, Scoring Configuration, Fields, Cluster Levels. Different cluster types may have different types of configurable data and fields.

Figure 6:
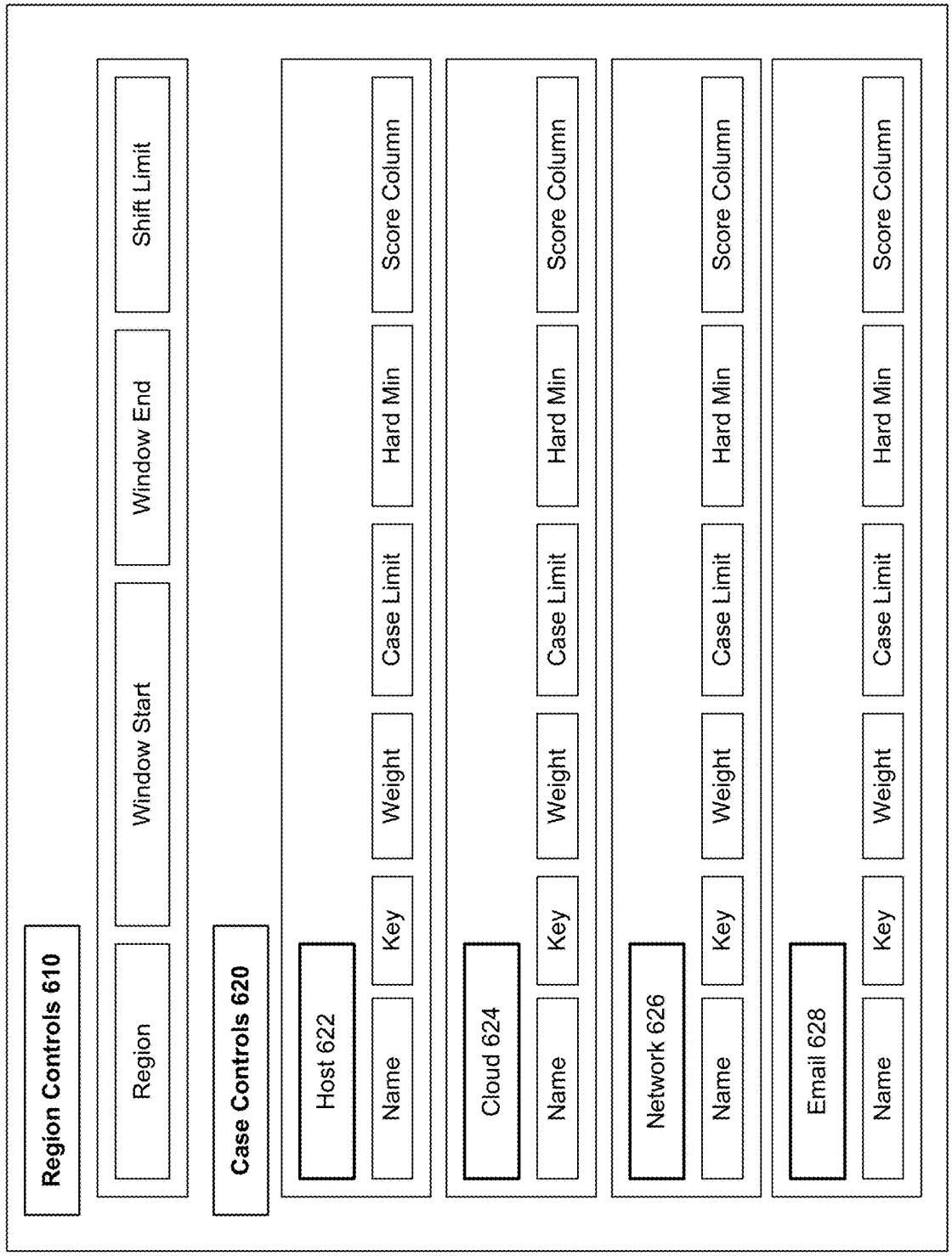
FIG. 6 is an exemplary user interface, according to an embodiment of the present invention.

FIG. 6 is an exemplary user interface, according to an embodiment of the present invention. FIG. 6 is an exemplary case selection configuration interface that shows how clusters may be prioritized for triage. Case selection types may include Region Controls 610 and Case Controls 620. Case Controls 620 may include Host 622, Cloud 624, Network 626, email 628, etc. Additional fields may include: Name, Key, Weight, Case Limit, Hard Minimum and Score Column. For example, overall case limits may be set for each shift, and limits and minimums may be set for each specific cluster type. In addition, weights may be applied to prioritize or deprioritize specific cluster types.

Figure 7:
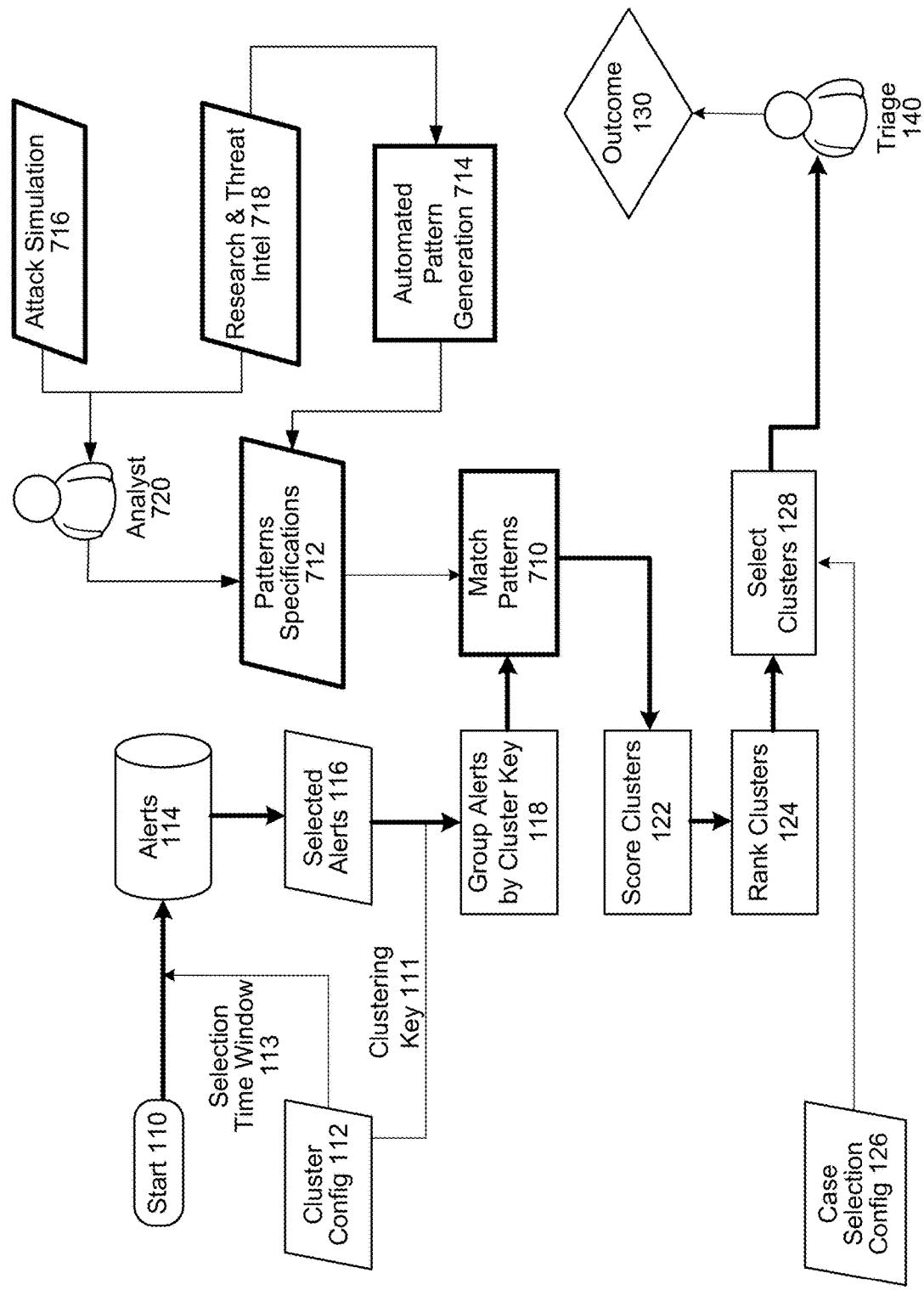
FIG. 7 is an exemplary overview diagram, according to an embodiment of the present invention.

FIG. 7 is an exemplary overview diagram, according to an embodiment of the present invention. Consistent with FIG. 1 above, a process may be initiated at 110. Alerts may be received at 114. Cluster Config 112 represents cluster configuration data. In this example, Selection Time Window 113 and Clustering Key 111 may be identified and applied. Clustering Key 111 may represent a key feature that is used to cluster the alerts. The Selection Time Window 113 may be applied to Alerts 114 to identify Selected Alerts 116. Clustering Key 111 may be applied to the Selected Alert 116 to generate Group Alerts by Cluster Key 118. Group Alerts by Cluster Key 118 may be used to Match Patterns, as shown by 710, which may then be applied to Score Clusters 122.

Consistent with FIG. 1 above, the Clusters may be ranked at 124 and Case Selection Config 126 may be applied to Selected Clusters 128. In addition, Case Selection Config 126 may adjust configuration selection parameters based on various factors and considerations. In certain situations, the adjustment may be automatic, based on feedback, AI/ML generated, etc. The resulting clusters may be available for analyst triage 140 at Outcome 130.

As shown in FIG. 7, an embodiment of the present invention is directed to pattern matching clusters that identify specific combinations or (order-specific) permutations of analytics occurring on the same cluster key within a certain time period. For example, the same cluster key may be a hostname. The cluster key may be the same, similar, related, etc. This provides the ability to identify highly-specific known patterns of analytics that correspond to past attack simulations, or actual attacker tactics, techniques and procedures based on threat intelligence.

Custom patterns, otherwise known as meta-alerts or alerts-of-alerts, may be used to identify specific patterns of alerts firing in clusters, e.g., on the same host within a given time frame. This provides opportunities to detect specific combinations of alerts that were observed to fire in tandem during known true positive events, such as penetration tests and simulations (e.g., purple team simulations). This method differs from the TSF-IDF scoring which may be considered a form of anomaly detection for when the attack pattern is not specified beforehand. The pattern matching clusters embodiment is based on having knowledge of the type of alert patterns that may be expected if there is malicious activity.

For example, pattern specifications 712 may be written manually by analysts, as shown by 720. According to another example, pattern specifications may be determined based on attack simulation data as shown by 716, research or threat intelligence as shown by 718 and/or other source of pattern data. In addition, an embodiment of the present invention may utilize a system that automatically generates pattern specifications based on structured threat intelligence data, as shown by 714.

An example pattern is provided below:
{
  "name": "cobaltstrike_susp_powershell_and_pipe",
  "description": "Alert pattern developed for October Pen Test",
  "author": "user1",
  "ref": "https://my_siem/analysts/issues/221",
  "pattern_type": "combination",
  "pattern field": "analytic name",
  "pattern": [
    "win_encoded_iex|win_susp_powershell_empire_launch",
    "win_pipe_from_unusual_process"
  ],
  "threshold": 1.0
}

The "name" field may represent the name or identifier of the specific alert pattern. The "description" field may represent a brief description of what the pattern looks for. The "author" field may represent a user identifier of the pattern author. The "ref" field may include a link to further documentation and background information relating to the pattern. The "pattern_type" field may be a "combination" (match pattern in any order) or "permutation" (match exactly in the order given). Other types of patterns may be supported. The "pattern_field" field may include a field in an Alerts index used for the pattern match. The "pattern" field may represent a specific pattern of analytics to match where the "|" allows interchangeable matching between a selection of results. The "threshold" field may represent the proportion (from 0.0 to 1.0) of the analytics required for a pattern to be considered matched. For example, the above pattern may be matched only when either of the first analytic is observed along with the second (a 100% match). The "threshold" defines a percentage match required for the pattern to be considered a match. According to another example, for a threshold of 0.5, if there are 10 analytics listed in the "pattern" field, a match of 5 of the 10 analytics would be considered sufficient for a match. This threshold may be generated automatically, or manually specified. Scoring for these types of clustered may be based on a scheme, such as a simplified scheme. For example, if a pattern is matched then the cluster score may be incremented by 1. Other scoring schemes and methodologies may be applied.

Those skilled in the art will appreciate that the diagrams discussed above are merely examples of a system and method for intelligently clustering alerts and applying novelty and accuracy scores to prioritize and effectively address cybersecurity alerts and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, IOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system comprising:
a computer server comprising one or more processors;
a memory component storing alert data; and
non-transitory memory comprising instructions that, when executed by the one or more processors, cause the one or more processors to:
receive a plurality of alerts from a threat detection system;
group the plurality of alerts into clusters based on a clustering key and a selection time window;
calculate a times series frequency-inverse document frequency (TSF-IDF) score for each cluster;
calculate an analytic confidence score for each cluster based on a true positive rate, a prior distribution and a posterior distribution;
combine the TSF-IDF score and the analytic confidence score for each cluster to generate an aggregate of alert scores wherein each individual alert score comprises an alert frequency, an inverse cluster frequency and the analytic confidence score;
select a subset of the clusters based on a case selection configuration;
transmit the subset of the clusters to an output interface to generate a triage output; and
apply a feedback based at least in part on the triage output to the analytic confidence score.

2. The computer-implemented system of claim 1, wherein the clustering key comprises IP address, host computer, location, or username.

3. The computer-implemented system of claim 1, wherein the analytic confidence score is a Bayesian estimation.

4. The computer-implemented system of claim 1, wherein the true positive rate is modeled as a Bernoulli random variable.

5. The computer-implemented system of claim 1, wherein the prior distribution is based on a random variable from a Beta-distribution.

6. The computer-implemented system of claim 1, wherein the posterior distribution is a combination of a binomial random variable with beta prior distribution; resulting in a beta-binomial conjugate distribution.

7. The computer-implemented system of claim 1, wherein the alert frequency is represented as a count of alert compared to a time window duration.

8. The computer-implemented system of claim 1, wherein the inverse cluster frequency is represented as a log function of the number of clusters as compared to the number of clusters containing the alert.

9. The computer-implemented system of claim 1, wherein the feedback is based on one or more of: an attack simulation result and a triage analyst determined outcome.

10. A computer-implemented method, comprising the steps of:
receiving, via a communication network, a plurality of alerts from a threat detection system;
grouping, via one or more computer processors, the plurality of alerts into clusters based on a clustering key and a selection time window;
calculating, via the one or more computer processors, a times series frequency-inverse document frequency (TSF-IDF) score for each cluster;
calculating, via the one or more computer processors, an analytic confidence score for each cluster based on a true positive rate, a prior distribution and a posterior distribution;
combining, via the one or more computer processors, the TSF-IDF score and the analytic confidence score for each cluster to generate an aggregate of alert scores wherein each individual alert score comprises an alert frequency, an inverse cluster frequency and the analytic confidence score;
selecting, via the one or more computer processors, a subset of the clusters based on a case selection configuration;
transmitting, via a user interface, the subset of the clusters to an output interface to generate a triage output; and
applying, via the one or more computer processors, a feedback based at least in part on the triage output to the analytic confidence score.

11. The computer-implemented method of claim 10, wherein the clustering key comprises IP address, host computer, location, or username.

12. The computer-implemented method of claim 10, wherein the analytic confidence score is a Bayesian estimation.

13. The computer-implemented method of claim 10, wherein the true positive rate is modeled as a Bernoulli random variable.

14. The computer-implemented method of claim 10, wherein the prior distribution is based on a random variable from a Beta-distribution.

15. The computer-implemented method of claim 10, wherein the posterior distribution is a combination of a binomial random variable with beta prior distribution resulting in a beta-binomial conjugate distribution.

16. The computer-implemented method of claim 10, wherein the alert frequency is represented as a count of alert compared to a time window duration.

17. The computer-implemented method of claim 10, wherein the inverse cluster frequency is represented as a log function of the number of clusters as compared to the number of clusters containing the alert.

18. The computer-implemented method of claim 10, wherein the feedback is based on one or more of: an attack simulation result and a triage analyst determined outcome.

* * * * *